(12) United States Patent
Kisel et al.

(10) Patent No.: US 8,542,603 B2
(45) Date of Patent: Sep. 24, 2013

(54) DISTRIBUTED RESOURCE MANAGEMENT IN NETWORKS

(75) Inventors: Andrey Kisel, Maidenhead (GB); Geoffrey Cristallo, Molenbeek (BE)

(73) Assignee: Alcatel Lucent, Paris (FR)

( * ) Notice: Subject to any disclaimer, the term of this patent is extended or adjusted under 35 U.S.C. 154(b) by 298 days.

(21) Appl. No.: 12/611,983

(22) Filed: Nov. 4, 2009

(65) Prior Publication Data

US 2010/0146574 A1    Jun. 10, 2010

(30) Foreign Application Priority Data

Nov. 5, 2008 (EP) .................................. 08291032

(51) Int. Cl.
*H04L 12/26* (2006.01)
(52) U.S. Cl.
USPC ........... 370/252; 370/392; 370/480; 370/338; 370/331; 725/115
(58) Field of Classification Search
None
See application file for complete search history.

(56) References Cited

U.S. PATENT DOCUMENTS

| 6,694,429 B1 | 2/2004 | Kalmanek et al. | |
|---|---|---|---|
| 2007/0118618 A1* | 5/2007 | Kisel et al. | 709/219 |

OTHER PUBLICATIONS

Rosenberg J. et al., "SIP Session Initiation Protocol," Network Working Group, XP015009039, pp. 1-269, Jun. 1, 2002.
"Telecommunications and Internet Converged Services and Protocols for Advanced Networking (TISPAN); IPTV Architecture; Dedicated Subsystem for IPTV Functions," ETSI TS 182 028, vol. TISPAN, No. V2.0.0, XP014040792, pp. 1-38, Jan. 1, 2008.
"Telecommunications and Internet Converged Services and Protocols for Advanced Networking (TISPAN); Dedicated IPTV Subsystem Stage 3 Specification," EPSI Standards, ETSI TS 184 064, vol. TISPAN, No. V2.1.1, XP002516523, pp. 1-46, Oct. 31, 2008.
European Search Report.

* cited by examiner

*Primary Examiner* — Huy D Vu
*Assistant Examiner* — Zewdu A Beyen
(74) *Attorney, Agent, or Firm* — Fay Sharpe LLP

(57) ABSTRACT

A data communication system is disclosed, comprising a network provided with a control server for managing network resources, and a delivery server for delivering multimedia content to one or more UE (user equipment) devices, wherein the control server is arranged to pass a network session ID, of a network session between the delivery server and the UE device, to the delivery server, and the delivery server is arranged to keep track of the network session independently of the control server, such that once the network session ID of the network session has been passed to the delivery server, the control server keeps no reference to the network session and takes no part therein.

10 Claims, 1 Drawing Sheet

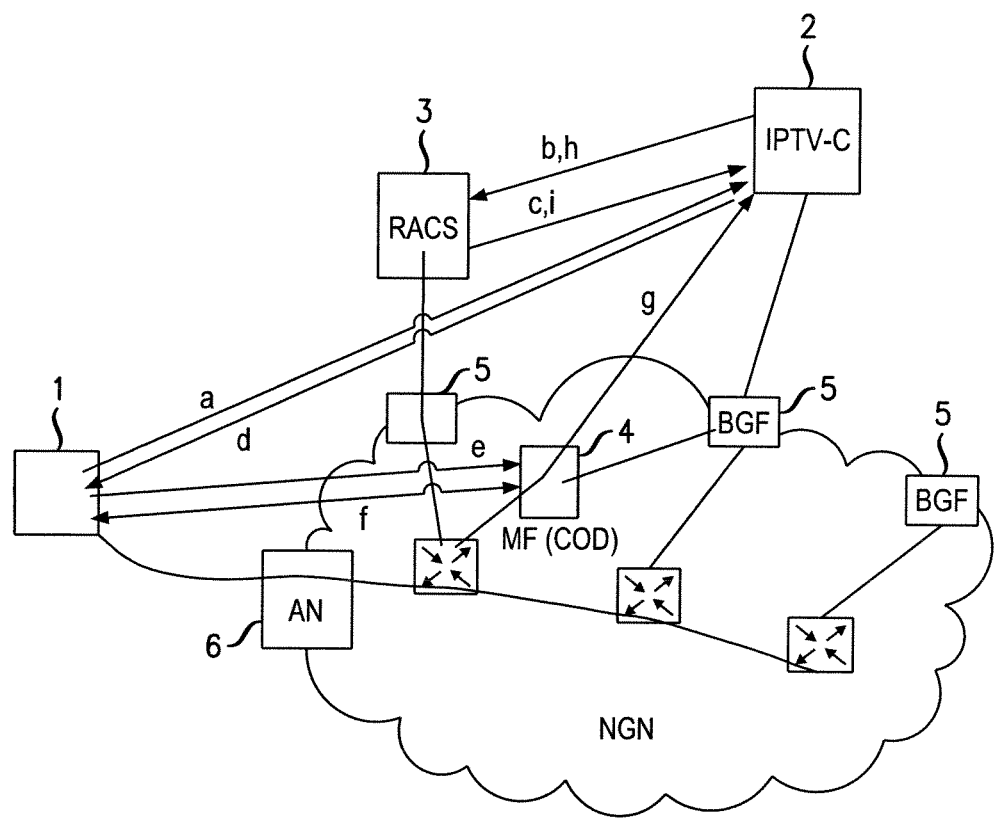

DISTRIBUTED RESOURCE MANAGEMENT IN NETWORKS

BACKGROUND OF THE INVENTION

The present invention relates to distributed resource management in networks. In particular, but not exclusively, it relates to resource management and tracking of network sessions in a Next Generation Network (NGN).

Next generation networking (NGN) is a broad term relating to networking that transports many kinds information and services (eg voice, data, multimedia and so on) in a packet-based system. This type of network may be used to provide Internet Protocol TV (IPTV) services to end users, or for other types of data. It relies on a Resource reservation and Admission Control Sub-system (RACS) to reserve and guarantee quality of service (QoS). Several standard bodies have addressed RAC subsystem architecture.

The International Telecoms Union (ITU-SGI) and the Alliance for Telecommunications Industry Standards (ATIS) have both specified the use of a Resource Access Control Facility (RAC-F). RAC-F and RACS are well known in themselves.

The European Telecommunications Standards Institute (ETSI) have specified the use of a Resource and Admission Control Sub-system (RACS).

DESCRIPTION OF THE PRIOR ART

ETSI TISPAN defined RACS architecture in ETSI ES 282 003: "Telecommunications and Internet converged Services and Protocols for Advanced Networking (TISPAN); Resource and Admission Control Sub-system (RACS): Functional Architecture". ETSI ES 282 003 specifies how other NGN subsystems (ie applications or service functions) should interact with RACS for authorization and resource reservation. In ETSI ES 282 003, however, it is assumed that the same functional entity will reserve, modify, refresh and release resources via, for example, an interface known as Gq'. Accordingly, the managing functional entity (for example control of Internet Protocol TV (IPTV), as defined in ETSI TS 102 028) is required to maintain track of sessions so that the resources can be released after use.

Considering an example; a CoD (Content on Demand) server typically delivers an IPTV CoD service, whilst it is an IPTV Control element which assumes resource management. Thus a single functional entity, the IPTV Control, is responsible for resource management and must maintain track of all QoS resources for the duration of all CoD sessions. A similar example exists in the IMS (Internet Protocol Multimedia Subsystem) domain, where the role of IPTV control is performed by the IMS core elements, eg S-CSCF (Service-Call Setup Control Function).

This approach creates scalability and performance limitations, because the functional entity requesting to reserve, modify, refresh and release resources (ie to reserve/release) is not the same as the functional entity actually delivering the service. Thus complications and networking issues can arise, which affect performance.

An alternative approach has been described in "ETSI DTS 183 064 V 0.0.5 (2008-03) ETSI Standard Technical Specification Telecommunications and Internet Converged Services and Protocols for Advanced Networking (TISPAN): Dedicated IPTV subsystem Stage 3 Specification", in which resource release is delegated to another functional entity called MCF after the IPTV control has reserved them.

However, this approach is only applicable if an operator allows distributed access to the network management interface, potentially from opened networks, which creates security risks not yet addressed in RACS.

A prior art arrangement is known from XP 015009039, which discloses an application-layer control protocol for creating, modifying and terminating sessions with one or more participants, including multimedia distribution.

BRIEF SUMMARY OF THE INVENTION

The present invention arose in an attempt to provide an improved resource management system.

The present invention provides a solution where distributed access to the network management interface is not required and where scalability and performance are not limited.

According to the present invention there is provided a data communication system, comprising a network provided with a control server for managing network resources, and a delivery server for delivering multimedia content to one or more UE (user equipment) devices, wherein the control server is arranged to pass a Quality of Service (QoS) network session ID, of a network session between the delivery server and the UE device, to the delivery server, and the delivery server is arranged to keep track of the network session independently of the control server, such that once the network session ID of the network session has been passed to the delivery server, the control server is stateless with regard to the network session, characterised in that the delivery server is adapted to pass the QoS network session ID of the network session back to the control server upon completion of the network session, and a Resource and Admissions Control Server (RACS) is provided, wherein the control server is adapted to instruct the RACS to terminate the network session upon receipt of the network session ID.

The control server may be adapted to pass the network session ID to the delivery server during establishment of the network session between the delivery server and the UE.

The control server may be adapted to pass the network session ID directly to the delivery server from the control server or indirectly, via the UE. The UE may be arranged to pass the network session ID to the delivery server using an RTSP (real time streaming protocol) 300 REDIRECT message. These are well known in themselves.

The UE may be IPTV equipment.

In effect, the invention involves outsourcing state tracking of a network session from a functional entity reserving resources to a functional entity delivering content.

According to the present invention in a further aspect, there is provided a method of managing network resources of a network having a control server for managing network resources, and a delivery server for delivering multimedia content to one or more UE (user equipment) devices; said method comprising passing a Quality of Service, QoS, network session ID, of a network session between the delivery server and the UE device, to the delivery server; and keeping track of the network session, independently of the control server, using the delivery server, such that once the network session ID of the network session has been passed to the delivery server, the control server is stateless with regard to the network session, characterised in that upon completion of the network session, the delivery server passes the network session ID of the network session back to the control server and the control server regains control, and upon receipt of the network session ID, the control server instructs a Resource and Admissions Control Server, RACS, to terminate the network session.

The control server preferably passes the network session ID to the delivery server during establishment of the network session between the delivery server and the UE. The network session ID may be passed directly to the delivery server from the control server or indirectly, via the UE. When passed indirectly, the network session ID is preferably passed to the delivery server from the UE using an RTSP 300 REDIRECT message.

By using the invention, a single functional entity, within the network, manages the resources without keeping state of QoS sessions. By virtue of this arrangement access to resource reservation within a closed network domain may be retained, since only the same functional entity is allowed to manage resources from security considerations. This improves security and can prevent Denial of Service (DoS) attacks, for example.

The invention also provides a data communication system or method including any one or more of the novel features, combinations of features, steps or combination of steps disclosed herein.

DESCRIPTION OF THE DRAWINGS

Embodiments of the invention will now be described, by way of example only, with reference to the accompanying schematic drawing:

FIG. 1 shows schematically a network.

DETAILED DESCRIPTION OF EMBODIMENTS OF THE INVENTION

Referring to FIG. 1, an embodiment of the invention is shown schematically. A UE 1, in this case a IPTV UE device (set-top box plus display for example) is connected to a next generation network (NGN). Whilst only a single UE 1 is shown it should be appreciated that there will generally be a large number of UEs 1 connected to the network, with network resources shared between the UEs 1.

The network is a NGN (next generation network), ie a network designed using IP and QoS (Quality of Service) technology to support all types of customer traffic including but not limited to voice, data and video, which enables a variety of IP-based customer devices and next generation and advanced applications to communicate over a single common network.

The network comprises an IPTV-C (IPTV control) 2 (defined in ETSI TS 182028), a RACS (resource and admission control server) 3, a MF (media function) 4 server, in this case a CoD server (MCF) for interactive media delivery, BGF (border gateway function) devices 5, and an access node (AN) 6 providing access to a local group of UEs. These components are shown schematically in the FIGURE.

It will be readily appreciated by the skilled person that alternative network arrangements, including networks other than so called NGNs (next generation networks), are possible within the scope of the present invention.

Operation of the network in an application where a user requires on-demand content, eg video on demand (VOD) will now be considered, referring to the labelled step in the FIGURE (note that the alphanumerically labelled lines in the FIGURE represent logical functional flow, rather than physical (or wireless) network connections.

In practice, the UE will, of course, connect to the network via an AN 6, which may be a DSLAM (Digital Subscriber Line Access Multiplexer):

a) A user selects on-demand content from the UE and the UE sends a request to the IPTV-C to initiate a CoD session.

b) Upon receipt of the request from the UE 1, the IPTV-C requests resource reservation from the RACS. The IPTV-C and the RACS are connected using a Gq' interface, as defined in ETSI TS 182 019. However, alternative interfaces can de used as defined in other standard bodies or for a, eg ATIS (Alliance for Telecommunications Industry Solutions), ITU (International Telecoms Union).

c) The RACS returns a QoS session ID to the IPTV-C.

d, e) The IPTV-C passes the QoS session ID to the CoD server, which will keep reference of the QoS session (resource reservation). The QoS Session ID is passed during establishment of the CoD session between CoD server and the UE. From this point the IPTV-C is stateless with regard to the CoD session, ie the IPTV-C does not know any more about QoS session it has just reserved—that is it does not keep reference to the QoS session and takes no part therein.

The QoS session ID is passed via the UE, using a RTSP (real time streaming protocol) 300 REDIRECT message, specified in RFC 2326. It should be noted, however that any alternative suitable protocol may be used or the session ID can be passed directly.

Whilst in the present example the QoS session is passed to the CoD server during establishment of the CoD session, it may alternatively be passed prior to establishment of the CoD session. Moreover, whilst in the present example the QoS session ID is passed to the CoD server indirectly, via the UE, it may alternatively be passed directly.

f) The CoD server keeps track of the QoS session whilst the CoD session is in service. As stated, during this period, the IPTV-C is stateless with regard to the QoS session.

g) The CoD server therefore knows the state of interactive content delivery and when the interactive delivery is no longer required, the COD server accordingly knows or determines when reserved resources (QoS session) are no longer required. Thus after the CoD session is finished, the CoD server notifies the IPTV-C that the QoS session exists and needs to be released and the CoD server passes the QoS session ID back to the IPTV-C, which is then no longer stateless with regard to the QoS session and now takes an active part again.

h, i) The IPTV-C triggers the RACS for QoS session termination via the Gq' interface, specifying the QoS session ID.

Thus, during normal operation, the IPTV control does not keep the track of QoS sessions (reserved resources), which allows the building of cost efficient distributed solutions. The QoS state is maintained where it is used, which removes the need to synchronise service sessions (CoD sessions) and resource reservation sessions (QoS sessions) between different functional entities.

State tracking of QoS sessions is therefore 'outsourced' from the functional entity reserving resources to the functional entity selected during the resource reservation stage for service delivery. The functional entity reserving the resources instructs the functional entity, selected to perform the service, that for the duration of the service it is in charge of keeping the track of QoS session. After the service is finished and the underlined QoS session is no longer required, the serving functional entity will notify back to the functional entity reserving resources that the reserved resources are no longer needed and can be released.

As described above, since a single entity (ie in this embodiment) the MF (COD) server 4 manages resources during a session, security is greatly improved, since security problems which can arise when several components/nodes in a network are minimised.

The present invention removes the scalability and performance limitations of the prior art by eliminating need for a single functional entity to keep track of all QoS sessions in the NGN (ie all IPTV CoD sessions); enables cost efficient implementation, since resource reservation and management can be performed by a stateless functional entity; eliminates the requirement for expensive synchronisation between service function and resource management function; and allows operator distributed resource management without using distributed access to the network management interfaces, which reduces security risks, preventing DoS (denial of service) attacks for example.

Whilst the embodiment described relates to IPTV, it should be noted that the present invention is applicable to distributed resource management for any type of multimedia content in a variety of networks, including but not limited to next generation networks and for other types of content and data than IPTV.

The invention claimed is:

1. A data communication system, comprising a network provided with a control server for managing network resources, a delivery server for delivering multimedia content to one or more UE (user equipment) devices, and a Resource and Admission Control Server, RACS, characterized in that: the control server is arranged to pass a Quality of Service (QoS) network session ID to the delivery server, said QoS network session ID being returned from the RACS in response to a resource reservation request from the control server for a Content on Demand (CoD) session between the delivery server and the UE device; the delivery server is arranged to keep track of the QoS network session ID independently of the control server, such that once the QoS network session ID has been passed to the delivery server, the control server is stateless with regard to the QoS network session, in which the delivery server is adapted to pass the QoS network session ID back to the control server upon completion of the CoD session; and the control server adapted to instruct the RACS to terminate the QoS network session upon receipt of the QoS network session ID from the delivery server.

2. A system as claimed in claim 1, wherein the control server is adapted to pass the QoS network session ID to the delivery server during establishment of the CoD session between the delivery server and the UE.

3. A system as claimed in claim 1, wherein the control server is adapted to pass the QoS network session ID to the delivery server from the control server.

4. A system as claimed in claim 1 wherein the control server and the UE are arranged to pass the QoS network session ID to the delivery server, via the UE.

5. A system as claimed in claim 4, wherein the UE is adapted to pass the QoS network session ID to the delivery server using an RTSP 300 REDIRECT message.

6. A system as claimed in claim 4 wherein the UE is IPTV equipment.

7. A method of managing network resources of a network having a control server for managing network resources, a delivery server for delivering multimedia content to one or more UE (user equipment) devices and a Resource and Admission Control Server (RACS); said method characterized by passing a Quality of Service (QoS) network session ID to the delivery server, said QoS network session ID being returned from the RACS in response to a resource reservation request from the control server for a Content on Demand (CoD) session between the delivery server and the UE device;
and keeping track of the QoS network session ID, independently of the control server, using the delivery server, such that once the QoS network session ID has been passed to the delivery server, the control server is stateless with regard to the QoS network session, in which upon completion of the CoD session, the delivery server passes the QoS network session ID back to the control server and the control server regains control, and upon receipt of the QoS network session ID from the delivery server, the control server instructs the RACS to terminate the QoS network session.

8. A method as claimed in claim 7, wherein the control server passes the QoS network session ID to the delivery server during establishment of the CoD session between the delivery server and the UE.

9. A method as claimed in claim 7, wherein the QoS network session ID is passed to the delivery server from the control server via the UE.

10. A method as claimed in claim 9, wherein the QoS network session ID is passed to the delivery server via the UE using an RTSP 300 REDIRECT message.

* * * * *